United States Patent
Seki et al.

(10) Patent No.: US 8,366,911 B2
(45) Date of Patent: Feb. 5, 2013

(54) METHOD OF PRODUCING LIQUID FUEL

(75) Inventors: Hiroyuki Seki, Yokohama (JP); Masahiro Higashi, Yokohama (JP); Sumio Saito, Kitakyushu (JP); Ryuzo Kuroda, Kitakyushu (JP); Takashi Kameoka, Kitakyushu (JP)

(73) Assignees: Nippon Oil Corporation, Tokyo (JP); JGC Catalysts & Chemicals Ltd., Kawasaki-Shi (JP)

( * ) Notice: Subject to any disclaimer, the term of this patent is extended or adjusted under 35 U.S.C. 154(b) by 420 days.

(21) Appl. No.: 12/451,158

(22) PCT Filed: Apr. 26, 2008

(86) PCT No.: PCT/JP2008/058154
§ 371 (c)(1),
(2), (4) Date: Oct. 28, 2009

(87) PCT Pub. No.: WO2008/139909
PCT Pub. Date: Nov. 20, 2008

(65) Prior Publication Data
US 2010/0122935 A1    May 20, 2010

(30) Foreign Application Priority Data
May 1, 2007  (JP) ................................ 2007-120522

(51) Int. Cl.
*C10G 47/14* (2006.01)
*C10G 47/18* (2006.01)

(52) U.S. Cl. ..................... 208/111.35; 208/138; 502/79; 502/103

(58) Field of Classification Search .................. 208/108, 208/111.35, 138, 143, 144; 502/79, 102, 502/103
See application file for complete search history.

(56) References Cited

U.S. PATENT DOCUMENTS

| 6,902,664 B2 * | 6/2005 | Timken ..................... 208/111.01 |
| 2005/0145541 A1 | 7/2005 | Sakoda et al. |
| 2005/0205462 A1 * | 9/2005 | Gopalakrishnan et al. ..... 208/78 |
| 2007/0029228 A1 | 2/2007 | Aoki et al. |
| 2009/0283443 A1 * | 11/2009 | Kuroda et al. ............. 208/111.1 |

FOREIGN PATENT DOCUMENTS

| EP | 0 098 040 | 1/1984 |
| EP | 0 537 815 A1 | 9/1992 |
| EP | 1 938 898 A1 | 9/2006 |
| EP | 2 000 203 A1 | 12/2008 |
| JP | 2004-255241 | 9/2004 |
| WO | WO 2007/032232 | * 3/2007 |

* cited by examiner

*Primary Examiner* — Walter D Griffin
*Assistant Examiner* — Renee E Robinson
(74) *Attorney, Agent, or Firm* — Manabu Kanesaka

(57) ABSTRACT

The present invention provides a method of producing a liquid fuel enabling production of middle distillate at a high yield from a feed oil containing paraffinic hydrocarbons having 20 to 100 carbon atoms as main components without losing the high cracking activity and also enabling provision of high quality gas oil included in the middle distillate.

A feed oil containing paraffinic hydrocarbons having 20 to 100 carbon atoms as main components is subjected to hydrotreating in the present of a prespecified hydrotreating catalyst and under the conditions for hydrotreating including a temperature of 200 to 350° C., a liquid hourly space velocity of 0.1 to 5.0 $h^{-1}$, and a partial pressure of hydrogen of 0.5 to 8 MPa to obtain an effluent oil, and then the effluent oil is fractionated to obtain middle distillate including a gas oil with a cetane number of 75 or over and a pour point of −27.5° C. or below at a yield of 55% or over against a total weight of the feed oil.

10 Claims, No Drawings

US 8,366,911 B2

METHOD OF PRODUCING LIQUID FUEL

BACKGROUND OF THE INVENTION

1. Technical Field

The present invention relates to a method of producing a liquid fuel enabling high yield production of middle distillate, which is liquid fuel, from a feed oil containing paraffinic hydrocarbons as main components.

2. Background Technology

Middle distillate (namely kerosene and gas oil) produced from a crude oil generally contain environmental pollutants such as sulfur compounds or aromatic compounds, which is a cause for environmental pollution. To overcome the problem described above, there has been proposed and known the method of producing a liquid fuel in which a feed oil containing paraffinic hydrocarbons as main components with the low content of environmental pollutants as described above is hydrotreated with a hydrotreating catalyst containing platinum supported on a carrier containing amorphous silica alumina and then fractionated to obtain environmental-friendly and clean middle distillate (Refer to, for instance, Patent document 1.) There has also been known the method of producing a liquid fuel in which is used a hydrotreating catalyst containing a metal belonging to Group VIII in the periodic table supported on a carrier containing crystalline aluminosilicate (Refer to, for instance, Patent document 2).

Patent document 1: JP H06-41549A
Patent document 2: JP 2004-255241A

DISCLOSURE OF THE INVENTION

The hydrotreating catalyst described in Patent document 1 shows a high selectivity for middle distillate when used for hydrocracking paraffinic hydrocarbons, but the hydrocracking function is rather low, and therefore it is required to rise a reaction temperature or lower a liquid hourly space velocity for maintaining the yield of middle distillate at a high level, which disadvantageously causes increase of energy consumption or decline of the productivity.

On the other hand, the hydrotreating catalyst described in Patent document 2 has a higher hydrocracking function as compared to that of catalysts containing the amorphous silica alumina described in Patent document 1, but the isomerizing function is low, which disadvantageously makes it impossible to realize high yield production of middle distillate.

The present invention was made in the light of the circumstances as described above, and it is an object of the present invention to provide a method of producing a liquid fuel enabling high yield of middle distillate preserving the high cracking activity from a feed oil containing paraffinic hydrocarbons having 20 to 100 carbon atoms as main components and also enabling provision of high quality gas oil.

The method of producing a liquid fuel according to the present invention includes the following steps for achieving the object described above, namely hydrotreating a feed oil containing paraffinic hydrocarbons each having 20 to 100 carbon atoms as main components in the presence of hydrotreating catalyst at a temperature of 200 to 350° C., at the liquid hourly space velocity of 0.1 to 5.0 h$^{-1}$, and under the partial pressure of hydrogen in the range from 0.5 to 8 MPa to obtain an effluent oil; and fractionating the effluent oil to obtain middle distillate including a gas oil with a cetane number of 75 or over and with a pour point of −27.5° C. or below at a yield of the middle distillate of 55% or over against a total weight of the feed oil. In the method, the hydrotreating catalyst includes an active metal component comprising platinum or palladium supported on a carrier containing an amorphous solid acid and a ultra-stable Y-type zeolite with an average particle diameter of 0.2 to 1.0 μm, a crystallinity of 1.02 to 1.10 based on the standard Y-type zeolite basis, and a specific surface area of 700 to 790 m$^2$/g, and also the hydrotreating catalyst has functions of dehydrogenating, isomerizing, hydrocracking, and hydrogenating hydrocarbons.

The ultra-stable Y-type zeolite (also referred to as "USY zeolite" hereinafter) used in the hydrotreating catalyst according to the present invention is made from particles with the average particle diameter of 0.2 to 1.0 μm, and the crystallinity based on that of the standard Y-type zeolite is in the range from 1.02 to 1.10, while the specific surface area is in the range from 700 to 790 m$^2$/g. Thus, the USY zeolite is characterized in that the crystallinity is high and also the purity is high.

The average particle diameter of the USY zeolite is calculated by measuring maximum lengths of, for instance, 100 secondary particles with a scanning electron microscope (SEM) and averaging the measured values. It is difficult to form USY zeolite with the average particle diameter of less than 0.2 μm, and when the average particle diameter is over 1.0 μm, the middle distillate are over cracked when the catalyst is used for hydrocracking paraffinic hydrocarbons, which disadvantageously leads to decline of yield of the middle distillate.

In the present invention, a crystallinity of the USY zeolite is calculated against that of the standard Y-type zeolite which is SK-40 produced by Union Carbide Corp as a reference material (This material is generally used as a reference material for calculating a crystallinity of Y-type zeolite, and is also simply referred to "SK-40" hereinafter). More specifically, a total peak height (H) for the (331) plane, (511) plane, (440) plane, (533) plane, (642) plane, and (555) plane for X-ray diffraction of the USY zeolite and the total peak height (H$_0$) for the same planes of SK-40 are measured, and the crystallinity is calculated through the following expression (1) assuming that a crystallinity of the SK-40 is 1. A crystallinity of the USY zeolite according to the present invention is 1.02 or over, preferably 1.03 or over, and more preferably 1.05 or over.

$$\text{Crystallinity}=H/H_0 \qquad (1)$$

A specific surface area of the USY zeolite according to the present invention when measured by the BET method is 700 m$^2$/g or over, preferably 720 m$^2$/g or over, more preferably 750 m$^2$/g or over, and still further preferably 780 m$^2$/g or over. The upper limit for the calculation is 790 m$^2$/g.

In a case of the generally known ultra-stable Y-type zeolite with the average particle diameter in the range from 0.2 to 1.0 μM, the crystallinity is less than 1.00, and/or the specific surface area is less than 700 m$^2$/g, and therefore it is generally known that the crystallinity is low.

Conditions for hydrotreating a feed oil include a temperature in the range from 200 to 350° C., preferably in the range from 240 to 290° C.; a liquid hourly space velocity in the range from 0.1 to 5.0 h$^{-1}$, preferably in the range from 0.5 to 2.0 h$^{-1}$; and a partial pressure of hydrogen in the range from 0.5 to 8 MPa, preferably in the range from 1.0 to 4.0 MPa.

When the temperature for hydrotreating is less than 200° C., the paraffinic hydrocarbons generally tend to be hardly isomerized, while, when the temperature is over 350° C., the paraffinic hydrocarbons are over cracked with the middle distillate yield lowered.

The liquid hourly space velocity (LHSV) is a volumetric flow rate of a feed oil in the standard state (25° C., 101325 Pa)

per capacity of a catalyst layer in which a catalyst is filled, and "h$^{-1}$" is an inverse number of an hour. When the liquid hourly space velocity is less than 0.1 h$^{-1}$, the paraffinic hydrocarbons tend to be over cracked with the middle distillate yield lowered, while, when the liquid hourly space velocity is over 5.0 h$^{-1}$, the paraffinic hydrocarbons are hardly cracked and the yield of middle distillate becomes lower also in this case.

When the partial pressure of hydrogen is less than 0.5 MPa, the hydrotreating catalyst tends to be easily degraded, and when the partial pressure of hydrogen is over 8 MPa, the reaction temperature tends to rise with the middle distillate yield lowered.

Further more a volume ratio of hydrogen versus feed oil is preferably in the range from 200 to 2000 NL/L, and more preferably in the range from 300 to 1000 NL/L. "NL" indicates a volume (L) of hydrogen in the normal state (0° C., 101325 Pa).

The yield of the middle distillate obtained by hydrotreating against a total mass of the feed oil is 55% or over, and more preferably 58% or over. The obtained middle distillate has a cetane number of 75 or over, and more preferably of 80 or over, and also the pour point of −27.5° C. or below, preferably −30.0° C. or below.

In the method of producing a liquid fuel according to the present invention, a silica/alumina ratio (molar ratio) of the ultra-stable Y-type zeolite is preferably in the range from 20 to 50, and more preferably in the range from 30 to 40. When the silica/alumina ratio is less than 20, the hydrocracking function tends to become excessively high with the middle distillate yield lowered. When the silica/alumina ratio is over 50, the hydrocracking function is low, and the temperature for hydrotreating reaction is required to be raised, and in this case the hydrotreating catalyst tends to be easily degraded.

A content of the ultra-stable Y-type zeolite against a total mass of the carrier is preferably in the range from 0.5 to 6 mass %, and more preferably in the range from 1 to 3 mass %. When the content of the USY zeolite is less than 0.5 mass %, the cracking activity tends to become lower with the liquid fuel yield lowered, and when the content is over 6 mass %, the cracking activity becomes too high with the middle distillate yield lowered.

The ultra-stable Y-type zeolite can be prepared by ion-exchanging NaY-type zeolite with ammonium ions and then treating the ion-exchanged zeolite in heated steam for dealumination.

In the method of producing a liquid fuel according to the present invention, the amorphous solid acid preferably contains one or over selected from the group consisting of amorphous silica alumina, amorphous silica zirconia, and amorphous alumina boria. The term of "amorphous" is also expressed by the terms of "noncrystalline", and the term indicates the state in which, even though some order exists within a somewhat short range, there is no crystalline structure which can be determined by means of X-ray diffraction. The amorphous silica alumina used in the method according to the present invention preferably contains $SiO_2$, as a component, by 50 to 95 mass %, and more preferably by 70 to 90 mass %. Furthermore, the amorphous zirconia used in the method according to the present invention contains $SiO_2$, as a component, by 10 to 50 mass %, and more preferably by 20 to 40 mass %. The amorphous alumina boria used in the method according to the present invention contains $Al_2O_3$, as a component, by 10 to 30 mass %, more preferably by 13 to 28 mass %, and still further preferably by 15 to 25 mass %.

Furthermore, a ratio of a mass (m) of the ultra-stable Y-type zeolite contained in the carrier versus a mass (n) of the amorphous solid acid (n/m) is preferably in the range from 1 to 60, more preferably in the range from 2 to 45, and furthermore preferably in the range from 5 to 30. When the ratio (n/m) is less than 1, the cracking activity tends to become too high with the yield of middle distillate lowered. On the contrary, when the ratio is over 60, the cracking activity tends to become lower with the yield of middle distillate also lowered.

In the method of producing a liquid fuel according to the present invention, a content of the active metal component against the total mass of the carrier is preferably in the range from 0.02 to 2 mass % as a metal, more preferably in the range from 0.05 to 1.5 mass %, and furthermore preferably in the range from 0.1 to 1.2 mass %. When the content of the active metal component against the total mass of the carrier is less than 0.02 mass % as a metal, the dehydrogenating function and the hydrogenating function of the hydrotreating catalyst tend to become lower with the yield of middle distillate lowered, and when the content is over 2 mass %, the hydrotreating catalyst becomes expensive. The active metal component can be supported on a carrier by any known method such as an impregnation method or an ion-exchange method.

The feed oil used in the method of producing a liquid fuel according to the present invention is preferably FT wax produced by means of the Fischer-Tropsch synthesis. The FT wax contains paraffinic hydrocarbons preferably by the content of 70 mass % or over. It is to be noted that the FT wax contains oxygen-containing compounds or olefins as by-products.

The oxygen-containing compounds are, for instance, alcohols having 16 or over carbon atoms and a hydroxyl group, and more specifically hexadecanol, heptadecanol, octadecanol or the like. In the present invention, a content of the oxygen-containing compounds in the FT wax is 10 mass % or below, preferably 5 mass % or below. When the content of the oxygen-containing compounds in the FT wax is over 10 mass %, the hydrotreating catalyst tends to be degraded with the operating life shortened.

The olefin is, for instance, a hydrocarbon including 20 or over carbon atoms and having one unsaturated double bond. A content of olefin in the FT wax is 20 mass % or below, and preferably 10 mass % or below. When a content of olefin in the FT wax is over 20 mass %, heat is easily generated locally in the reaction system due to hydrogenation of the olefin, which tends to lead to decline of the selectivity for the middle distillate.

In the method of producing a liquid fuel according to the present invention, a content of the oxygen-containing compounds in the middle distillate is preferably 0.1 mass % or below. When the content of the oxygen-containing compounds in the middle distillate is more than 0.1 mass %, the oxidation stability of the middle distillate disadvantageously tends to become lower.

The hydrotreating catalyst used in the method of producing a liquid fuel according to the present invention contains an amorphous solid acid, ultra-stable Y-type zeolite, and an active metal component comprising platinum or palladium, and has the dehydrogenating function, the isomerizing function, the hydrocracking function, and hydrogenating function of the hydrocarbons. Therefore with the hydrotreating catalyst, the hydrotreating processing can be performed efficiently, and middle distillate can be obtained at a high yield. Furthermore, because the ultra-stable Y-type zeolite has the average particle diameter in the range from 0.2 to 1.0 μm, the crystallinity against that of the standard Y-type zeolite as a reference in the range from 1.02 to 1.10, and the specific surface area in the range from 700 to 790 m$^2$/g, the cracking activity is improved. Furthermore, because the gas oil included in the obtained middle distillate has the cetane number of 75 or over, and the pour point of −27.5° C. or below, the middle distillate can advantageously be used as a liquid fuel.

BEST MODE FOR CARRYING OUT THE INVENTION

Descriptions are provided below for a method of producing a liquid fuel according to an embodiment of the present invention.

<Hydrotreating Catalyst>

The hydrotreating catalyst used in the present invention can be produced by having an active metal component, which is platinum or palladium, supported on a carrier including an amorphous solid acid, ultra-stable Y-type zeolite having the average particle diameter of 0.2 to 1.0 μm, the crystallinity of 1.02 to 1.10 against that of the standard Y-type zeolite as a reference, and the specific surface area of 700 to 790 m$^2$/g, and a binder.

The ultra-stable Y-type zeolite having the characteristics as described above can be produced, for instance, by subjecting NaY-type zeolite having a high crystallinity to ion exchange with ammonium ions and then exposing the ion-exchanged zeolite to heated steam for dealumination. A silica-alumina molar ratio of the obtained USY zeolite is preferably in the range from 20 to 50. With the process for ultra-stabling Y-type zeolite as described above, it is generally possible to form new pores with the pore diameter of 20 to 100 Å in addition to the fine pores of 20 Å or below which the Y-type zeolite originally has and is sometimes referred to as "micro pores". A content of the ultra-stable Y-type zeolite in the total weight of the carrier is preferably in the range from 0.5 to 6 mass %.

One or over selected from the group consisting of amorphous silica alumina, amorphous silica zirconia, and amorphous alumina boria may be used as the amorphous solid acid. The amorphous solid acid is added so that a ratio of a mass (m) of the ultra-stable Y-type zeolite versus a mass (n) of the amorphous solid acid is in the range from 1 to 60.

As the binder, it is possible to use alumina, silica, titania, magnesia or the like. A blending ratio of the binder is preferably in the range from 5 to 99 mass % of a total weight of the carrier, and more preferably in the range from 20 to 99 mass %.

A content of the active metal component is preferably in the range from 0.02 to 2 mass % of a total weight of the carrier as a metal.

A mixture of the ultra-stable Y-type zeolite, the amorphous solid acid, and the binder is molded into a cylindrical form, for instance, with the diameter of 1/16 inches (about 1.6 mm) and the length of 5 mm with an extrusion molding machine, and then the molded mixture is calcinated at a temperature of 450 to 550° C. to prepare a carrier. Furthermore, platinum or palladium is added to the obtained carrier by means of the impregnation method or the ion-exchange method to prepare the hydrotreating catalyst.

<Method of Hydrotreating Paraffinic Hydrocarbons>

The hydrotreating method according to the present invention enables acquisition of an effluent oil by hydrotreating a feed oil containing paraffinic hydrocarbons having 20 to 100 carbon atoms as main components in the presence of the hydrotreating catalyst described above and under the conditions for hydrotreating including the temperature of 200 to 350° C., the liquid hourly space velocity of 0.1 to 5.0 hr$^{-1}$, and the partial pressure of hydrogen of 0.5 to 8 MPa. There is no specific restriction over a hydrogen/oil ratio, but the ratio is preferably in the range from 200 to 2000 NL/L.

As the feed oil, it is preferable to use the FT wax produced by the Fischer-Tropsch synthesis and containing paraffinic hydrocarbons by 70 mass % or over. The FT wax may contain, as by-products, the oxygen-containing compounds by 10 mass % or below and/or olefin by 20 mass % or below.

Any known fixed bed reactor based on the conventional technology may be used for hydrotreating the paraffinic hydrocarbons.

<Method of Producing a Liquid Fuel>

The effluent oil obtained by hydrotreating can be fractionated to desired fractions such as, for instance, naphtha fraction (with the boiling point of 145° C. or below), middle distillate (with the boiling point of 145° C. to 360° C.) and a gas oil (with the boiling point of 260° C. to 360° C.) by means of topping. The liquid fuel can be produced as described above.

EXAMPLES

Hydrotreating Catalyst A 1.614 kg of a sodium aluminate aqueous solution (containing Na$_2$O by 17 mass % and Al$_2$O$_3$ by 22 mass % as components. The condition also applicable in the following descriptions.) with the concentration of 39 mass % was added with agitation in 6.685 kg of a sodium hydroxide aqueous solution with the concentration of 41.95 mass %. Furthermore the mixed solution was added with agitation to 13.053 kg of water glass No. 3 (containing SiO$_2$ by 24 mass % and Na$_2$O by 7.7 mass % as components. The conditions also applicable in the following description.) to obtain seeds composition. Furthermore, the seeds composition was agitated for 30 minutes and then left in the static state for 13 hours at a temperature in the range from 30 to 35° C. to obtain 21.351 kg of seeds.

Then, 18.244 kg of an aluminum sulfate aqueous solution with the concentration of 23.6 mass % (containing Al$_2$O$_3$ as a component by 7 mass %. This condition also applicable in the following description.) to 5.327 kg of pure water, and the solution was well agitated for mixing. Furthermore 22.947 kg of water glass No. 3 was added to the solution above, and the mixed solution was agitated for mixing to obtain a crystallized liquid. Then, 21.351 kg of the seeds were added to the crystallized liquid and the mixed solution was sufficiently agitated for mixing, and then the mixed solution was agitated for 3 hours at the room temperature for aging to obtain a reaction mixture.

The reaction mixture was passed through a colloid mill for softening, and then was loaded to and aged in a tank for crystallization for 40 hours at the temperature of 95° C. to obtain the crystallized Y-type zeolite. After the aging process was completed, the tank for crystallization was cooled down to take out the crystallized material (substantially a rough composition of Y-type zeolite). The crystallized material was subjected to filtering, cleaning, and drying successively to obtain about 7.3 kg of NaY-type zeolite (referred to as "NaY (a)" in the following description). An average particle diameter, a crystallinity, a unit cell dimension, an silica/alumina ratio, and a specific surface area of the NaY(a) were measured. The measured values are as shown in Table 1.

TABLE 1

|  | NaY (a) | NaY (b) | NaY (c) |
|---|---|---|---|
| Crystallinity (%) | 1.05 | 1.04 | 0.86 |
| Unit cell dimension (Å) | 24.67 | 24.66 | 24.66 |
| Silica-alumina molar ratio | 5.0 | 5.1 | 5.1 |

TABLE 1-continued

|  | NaY (a) | NaY (b) | NaY (c) |
|---|---|---|---|
| Specific surface area (m²/g) | 728 | 730 | 698 |
| Average particle diameter (μm) | 0.3 | 1.0 | 0.3 |

Furthermore, the obtained NaY(a) was ion-exchanged with ammonium sulfate and subjected to a steaming process to obtain HY zeolite. The HY zeolite was ion-exchanged with ammonium sulfate and subjected to a steaming process to obtain a crude USY zeolite. Then the crude USY zeolite was processed with a sulfuric acid to obtain the ultra-stable Y-type zeolite (also referred to as "USY(a)" in the following description). An average particle diameter, a crystallinity, a unit cell dimension, a silica-alumina molar ratio, and a specific surface area of the USY(a) were measured, and the measure values are as shown in Table 2.

TABLE 2

|  | USY (a) | USY (b) | USY (c) |
|---|---|---|---|
| Crystallinity (%) | 1.05 | 1.03 | 0.83 |
| Unit cell dimension (Å) | 24.35 | 24.34 | 24.34 |
| Silica-alumina molar ratio | 40.1 | 40.3 | 40.2 |
| Specific surface area (m²/g) | 782 | 730 | 702 |
| Average particle diameter (μm) | 0.3 | 1.0 | 0.3 |

Then 30 g of the obtained USY (a) was mixed with 270 g of silica alumina with the silica-alumina molar ratio of 6.1 and 700 g of alumina as a binder, and the mixture was molded with an extrusion molding machine into a cylindrical form with the diameter of 1/16 inches (about 1.6 mm) and the length of 5 mm, and the molded mixture was calcinated in air for one hour at the temperature of 500° C. to obtain a carrier. An aqueous solution of hexachloroplatinic acid with the platinum content of 0.5 mass % was impregnated in the obtained carrier, and the carrier was dried for 3 hours at 120° C. and calcinated for one hour at 500° C. to obtain a hydrotreating catalyst A (also simply referred to as "catalyst A" in the following description). Composition of the hydrotreating catalyst A is as shown in Table 3.

TABLE 3

|  | Cat (A) | Cat (B) | Cat (C) | Cat (D) | Cat (E) | Cat (F) |
|---|---|---|---|---|---|---|
| USY (a) (g) | 30 | 20 | 30 |  |  |  |
| USY (b) (g) |  |  |  | 30 |  |  |
| USY (c) (g) |  |  |  |  | 30 | 20 |
| Silica alumina (g) | 270 |  |  |  |  |  |
| Alumina Boria (g) |  | 570 |  |  |  | 570 |
| Alumina (g) | 700 | 410 | 970 | 970 | 970 | 410 |
| Platinum (g) | 5 | 5 | 5 | 5 | 5 | 5 |

Hydrotreating Catalyst B

The hydrotreating catalyst B is different from the hydrotreating catalyst A in the point that 20 g of the USY(a), 570 g of alumina boria having the alumina/boria molar ratio of 5.7, and 410 g of alumina as a binder are mixed together. Composition of the hydrotreating catalyst B is as shown in Table 3.

Hydrotreating Catalyst C

The hydrotreating C is different from the hydrotreating catalyst A in the point that 30 g of the USY zeolite (a) and 970 g of alumina as a binder are mixed together. Composition of the hydrotreating catalyst C is as shown in Table 3.

Hydrotreating Catalyst D

The ultra-stable Y-type zeolite (also referred to as USY(b) in the following description) was produced by processing 7 kg of the NaY-type zeolite commercially procurable from the market (for instance, CBV 100 produced by Zeolist Corp. Referred to as "NaY(b)" in the following description) like in the method of producing the hydrotreating catalyst A. A crystallinity, a unit cell dimension, a silica-alumina molar ratio, and a specific surface area of the NaY(b) and the USY(b) were measured respectively. The NaY(b) and the USY(b) have the characteristics as shown in Tables 1 and 2.

Furthermore, 30 g of the USY(b) obtained as described above and 970 g of alumina as a binder were mixed with each other and the mixture was processed like in the method of producing the hydrotreating catalyst A to prepare a hydrotreating catalyst D. Composition of the hydrotreating catalyst D is as shown in Table 3.

Hydrotreating Catalyst E 1.391 kg of sodium aluminate with the concentration of 39 mass % was added with agitation to 10.621 kg of sodium hydroxide aqueous solution with the concentration of 22.76 mass %. Furthermore, the mixture solution was added with agitation to 11.250 kg of water glass No. 3 to obtain seeds composition. After the seeds composition was agitated for 30 minutes, the mixture was left in the static state for aging for 20 hours at the room temperature. Then the mixture was heated to 80° C. over 60 minutes, and was rapidly cooled to 50° C., and was subjected to filtering, and cleaning to obtain 9.50 kg of seeds.

Then, 7.53 kg of a silica aqueous solution with the concentration of 47.0 mass % and 19.978 kg of water glass No. 3 were added to 28.539 kg of pure water, and the mixture solution was agitated for mixing. Furthermore, 5.124 kg of the seeds were added to the solution, and the resultant mixture solution was agitated for mixing. Then 6.691 kg of sodium aluminate aqueous solution was added and the mixture solution was sufficiently mixed for homogenizing the mixture, and was agitated for aging for 3 hours at the room temperature to obtain a reaction mixture.

The reaction mixture was pulverized with a microfluidizer, loaded into a tank for crystallization, and aged for 10 to 100 hours (for 40 hours in this example) to obtain crystallized Y-type zeolite. After completion of aging, the tank for crystallization was cooled and the crystallized material (substantially a crude product of Y-type zeolite) was took out and then was subjected to filtering, cleaning, and drying in succession to obtain about 7.0 kg of NaY-type zeolite (also referred to "NaY(c)" in the following description). An average particle diameter, a crystallization degree, a unit cell dimension, a silica-alumina molar ratio, and a specific surface area of the NaY(c) were measured. The NaY-type zeolite(c) had the characteristics shown in Table 1.

Furthermore, the NaY-type zeolite(c) was processed like in the method of producing the hydrotreating catalyst A to prepare the ultra-stable Y-type zeolite (referred to as "USY(c)"). A crystallinity, a unit cell dimension, a silica-alumina molar ratio, and a specific surface area of the USY(c) were measured. The characteristics of the USY(c) are as shown in Table 2.

Furthermore, 30 g of the obtained USY(c) and 970 g of alumina as a binder were mixed, and the mixture was processed like in the method of producing the hydrotreating catalyst A to prepare a hydrotreating catalyst E. Composition of the hydrotreating catalyst E is shown in Table 3.

Hydrotreating Catalyst F

The hydrotreating catalyst F is different from the hydrotreating catalyst E in the point that 20 g of the USY(c), 570 g of alumina boria having the alumina/boria molar ratio of 5.7, and 410 g of alumina as a binder are mixed together. Composition of the hydrotreating catalyst F is shown in Table 3.

Hydrotreating and Method of Producing a Liquid Fuel

Example 1

At first, 100 ml of the hydrotreating catalyst A was loaded in a fixed bed reactor, and then hydrotreating catalyst A was reduced in a hydrogen gas flow with the partial pressure of hydrogen of 3 MPa at 340° C. Then, the FT wax produced by means of Fischer-Tropsch synthesis as a feed oil was hydrotreated by using the hydrotreating catalyst A. The FT wax contains paraffinic hydrocarbons having 20 to 89 carbon atoms as a main component by 85 mass % (including normal paraffin by 81 mass % and isoparaffin by 4 mass %), oxygen-containing compositions as a by-product by 3 mass %, and olefin by 10 mass %.

In the hydrocracking reaction, the temperature (reaction temperature) was controlled under the conditions including the partial pressure of hydrogen of 3 MPa and the liquid hourly space velocity of the feed oil of 2.0 $h^{-1}$ so that a concentration of the decomposition products having the boiling point of 360° C. or below was adjusted to 80% of a weight of the feed oil, namely the conversion rate was adjusted to 80%. The reaction temperature in this step was 288° C. (Refer to Table 4). The decomposition products were fractionated by distillation to naphtha (with the boiling point of 145° C. or below), kerosene (with the boiling point of 145° C. to 260° C.), and gas oil (with the boiling point of 260° C. to 360° C.), and yields of the fractions were measured. The result is shown in Table 4. The middle distillate yield was calculated as a sum of the kerosene yield and the gas oil yield. A pour point and a cetane number of the gas oil were measured by the methods described in JIS K 2269 and in JIS K 2280 respectively, and the result is shown in Table 4. Furthermore, the oxygen-containing materials contained in the middle distillate were measured by elemental analysis based on the LECO method to obtain the oxygen removal rate, and the result is shown in Table 4.

Example 2, Comparative Examples 1 to 4

Example 2, and comparative examples 1 to 4 are different from Example 1 in the point the hydrotreating catalysts B to F were used, in place of the hydrotreating catalyst A, in the examples respectively. The reaction temperature required for adjusting the conversion rate to 80%, the yield of middle distillate, the pour points and the cetane numbers of gas oil, and the removable rate of the oxygen-containing compounds in each of Examples 2 and Comparative examples 1 to 4 are shown in Table 4.

Comparative Example 5

Comparative Example 5 is different from Example 2 in the point that the catalyst C was used in place of the catalyst B. The reaction temperature required for adjusting the conversion rate to 80%, the yield of middle distillate, the pour point and the cetane number of gas oil, and the removable rate of the oxygen-containing compounds are shown in Table 4.

TABLE 4

| | | Reaction Temp. (° C.) | Conversion Rate (mass %) | Middle Distillate Yield (mass %) | Characteristic of gas oil | | Oxygen removal rate (%) |
| --- | --- | --- | --- | --- | --- | --- | --- |
| | | | | | Pour point (° C.) | Cetane number | |
| Ex 1 | Cat A | 288 | 80 | 59 | −27.5 | 80 | 100 |
| Ex 2 | Cat B | 304 | 80 | 63 | −27.5 | 79 | 100 |
| Com. Ex 1 | Cat C | 315 | 80 | 59 | −25.0 | 81 | 100 |
| Com. Ex 2 | Cat D | 331 | 80 | 51 | −22.5 | 80 | 100 |
| Com. Ex 3 | Cat E | 325 | 80 | 54 | −22.5 | 79 | 100 |
| Com. Ex 4 | Cat F | 329 | 80 | 59 | −25.0 | 80 | 100 |
| Com. Ex 5 | Cat C | 304 | 19 | 14 | −22.5 | 81 | 64 |

It is understood from the descriptions above that middle distillate can be obtained by paraffinic hydrocarbons containing oxygen-containing compounds and olefin at a high yield, a gas oil having a lower pour point and a high cetane number can be obtained, and also that the oxygen-containing compounds can efficiently be removed.

The present invention is not limited to the embodiment described above, and various changes are possible without changing the point of the present invention. For instance, a case is allowable in which the method of producing a liquid fuel according to the present invention is configured by combining portions or all of the examples or the variants described above.

For instance, silica zirconia may be used as an amorphous solid acid in the method of producing a liquid fuel according to the embodiment of the present invention.

The invention claimed is:
1. A method of producing a liquid fuel comprising the steps of:
hydrotreating an FT wax produced by a Fischer-Tropsch synthesis containing
paraffinic hydrocarbons each having 20 to 100 carbon atoms as main components in a presence of hydrotreating catalyst at a temperature of 200 to 350° C.,
at the liquid hourly space velocity of 0.1 to 5.0 $h^{-1}$, and under a partial pressure of hydrogen in a range from 0.5 to 8 MPa to obtain an effluent oil; and
fractionating the effluent oil to obtain middle distillate including a gas oil with a cetane number of 75 or more and with a pour point of −27.5° C. or lower at a yield of the middle distillate oil of 55% or more with respect to a total weight of the FT wax, wherein the hydrotreating catalyst includes an active metal component comprising platinum or palladium supported on a carrier containing an amorphous solid acid, and
a ultra-stable Y-type zeolite with
an average particle diameter of 0.2 to 1.0 μm,
a crystallinity of 1.02 to 1.10 based on a standard Y-type zeolite basis, and
a specific surface area of 700 to 790 m²/g, and also
the hydrotreating catalyst has functions of dehydrogenating, isomerizing, hydrocracking, and hydrogenating hydrocarbons.

2. The method of producing a liquid fuel according to claim 1, wherein the ultra-stable Y-type zeolite has a silica-alumina molar ratio of 20 to 50.

3. The method of producing a liquid fuel according to claim 1, wherein the ultra-stable Y-type zeolite is contained at a concentration of 0.5 to 6 mass % relative to a total weight of the carrier.

4. The method of producing a liquid fuel according to claim 1, wherein the ultra-stable Y-type zeolite is prepared by ion exchanging an Na Y-type zeolite with ammonium ions thereby obtaining an ion-exchanged zeolite and then dealuminating the ion-exchanged zeolite in heated steam.

5. The method of producing a liquid fuel according to claim 1, wherein the amorphous solid acid includes one or more selected from the group consisting of amorphous silica alumina, amorphous silica zirconia, and amorphous alumina boria.

6. The method of producing a liquid fuel according to claim 1, wherein a ratio of a mass (m) of the ultra-stable Y-type zeolite contained in the carrier versus a mass (n) of the amorphous solid acid (n/m) is in a range from 1 to 60.

7. The method of producing a liquid fuel according to claim 1, wherein the active metal component is contained as a metal by 0.02 to 2 mass % relative to a total weight of the carrier.

8. The method of producing a liquid fuel according to claim 1, wherein the FT wax contains the paraffinic hydrocarbons by 70 mass % or more.

9. The method of producing a liquid fuel according to claim 1, wherein the FT wax contains oxygen-containing compounds by 10 mass % or less and/or olefin by 20 mass % or less.

10. The method of producing a liquid fuel according to claim 1, wherein the middle distillate contain oxygen-containing compounds by 0.1 mass % or less.

* * * * *